(12) United States Patent
Kellermann

(10) Patent No.: US 11,391,431 B2
(45) Date of Patent: Jul. 19, 2022

(54) MOTORCYCLE LIGHT HAVING AN EMITTING BODY SEALING THE HOUSING WITH A RAISED LINE SHAPED MOLDING

(71) Applicant: Kellermann GmbH, Aachen (DE)

(72) Inventor: Guido Kellermann, Aachen (DE)

(73) Assignee: Kellermann GmbH, Aachen (DE)

( * ) Notice: Subject to any disclaimer, the term of this patent is extended or adjusted under 35 U.S.C. 154(b) by 0 days.

(21) Appl. No.: 17/089,975

(22) Filed: Nov. 5, 2020

(65) Prior Publication Data

US 2022/0136672 A1    May 5, 2022

(51) Int. Cl.
| | | |
|---|---|---|
| *F21S 41/33* | (2018.01) | |
| *F21S 41/19* | (2018.01) | |
| *F21S 41/255* | (2018.01) | |
| *F21W 107/17* | (2018.01) | |

(52) U.S. Cl.
CPC ............. *F21S 41/335* (2018.01); *F21S 41/19* (2018.01); *F21S 41/255* (2018.01); *F21W 2107/17* (2018.01)

(58) Field of Classification Search
CPC ........... G02B 19/0028; F21W 2107/17; F21W 41/255; F21W 41/265; F21S 41/25; F21S 41/26; F21S 41/27; F21S 41/275; F21S 41/143; F21V 7/0091; F21V 5/045
See application file for complete search history.

(56) References Cited

U.S. PATENT DOCUMENTS

| | | | | |
|---|---|---|---|---|
| 9,835,309 | B2* | 12/2017 | Cho | .................... G02B 19/0028 |
| 10,408,430 | B2* | 9/2019 | Jung | .................... G02B 19/0061 |
| 10,801,692 | B2* | 10/2020 | Johnson | ................. F21S 41/143 |
| 2017/0254500 | A1 | 9/2017 | Ledgers et al. | |
| 2019/0093851 | A1 | 3/2019 | Johnson et al. | |

FOREIGN PATENT DOCUMENTS

| | | |
|---|---|---|
| DE | 10 2016 124 492 A1 | 2/2018 |
| DE | 10 2019 112 482 A1 | 11/2019 |

OTHER PUBLICATIONS

German Search Report in DE 10 2020 109 263.6, dated Dec. 9, 2020, with English translation of relevant parts.

* cited by examiner

*Primary Examiner* — Robert J May
(74) *Attorney, Agent, or Firm* — Collard & Roe, P.C.

(57) ABSTRACT

In order to provide a motorcycle light in which a sufficient and sufficiently distributed light intensity can be provided with an emitting surface that appears as attractive as possible, it is assumed that the appearance of a motorcycle light is decisively influenced by the emitting surface and the subassemblies located in front of it in the main beam direction thereof, starting from the light sources and extending via the subassemblies that influence the light up to the emitting surface, wherein precisely the emitting surface and these subassemblies are also responsible for a sufficient and a sufficiently distributed light intensity. In particular, this influence and responsibilities seem to be of greater importance than the housing of the motorcycle light, which traditionally has been accorded great importance.

7 Claims, 6 Drawing Sheets

MOTORCYCLE LIGHT HAVING AN EMITTING BODY SEALING THE HOUSING WITH A RAISED LINE SHAPED MOLDING

BACKGROUND OF THE INVENTION

1. Field of the Invention

The invention relates to a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source.

2. Description of the Related Art

Such motorcycle lights are known, for example, from the as yet unpublished German Patent Application DE 10 2019 112 482.4.

SUMMARY OF THE INVENTION

It is the task of the present invention to provide a motorcycle light in which a sufficient and sufficiently distributed light intensity can be created with an emitting surface that appears as attractive as possible.

The task of the invention is accomplished by motorcycle lights having the features of the independent claims. Further advantageous configurations, which as the case may be are also independent thereof, are specified in the dependent claims as well as in the following description.

The invention is based on the knowledge that the appearance of a motorcycle light is decisively influenced by the emitting surface and the subassemblies located in front of it in the main beam direction, starting from the light sources and extending via the subassemblies that influence the light up to the emitting surface, wherein precisely the emitting surface and these subassemblies are also responsible for a sufficient and a sufficiently distributed light intensity. In particular, this influence and responsibilities seem to be of greater importance than the housing of the motorcycle light, which traditionally has been accorded great importance.

In order to provide motorcycle lights in which a sufficient and sufficiently distributed light intensity can be created with an emitting surface that appears as attractive as possible, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least three light sources and for each of these light sources precisely one reflector body, one refractive body and/or one mirror as well as a partial emitting surface representing a part of the emitting surface are provided and the emitting body has on its emitting surface at least one line-shaped raised molding, which deflects light laterally relative to the main beam direction and extends at least over two of the partial emitting surfaces. Given suitable configuration, the overall appearance of the motorcycle light may be constructed compactly hereby if the raised molding extends over at least two partial emitting surfaces, even though a relatively large number of light sources with the associated optical subassemblies results at first in a choppy appearance.

Cumulatively or alternatively thereto, in order to provide motorcycle lights in which a sufficient and sufficiently distributed light intensity can be created with an emitting surface that appears as attractive as possible, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least three light sources and for each of these light sources precisely one reflector body, one refractive body and/or one mirror as well as a partial emitting surface representing a part of the emitting surface are provided and the emitting body has on its emitting surface at least one line-shaped raised molding, which deflects light laterally relative to the main beam direction, and their beginning and their end lies on a rim of the emitting surface. Given suitable configuration, the overall appearance of the motorcycle light may also be constructed compactly hereby if the beginning and end of the raised molding lies on a rim of the emitting surface, even if a relatively large number of light sources with the associated optical subassemblies results at first in a choppy appearance.

Moreover, cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least three light sources are provided and the reflector body on the one hand and the emitting body on the other hand are constructed as separate subassemblies, in order to provide a motorcycle light in which a sufficient and sufficiently distributed light intensity can be created with an emitting surface that appears as attractive as possible. Cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least three light sources are provided and the refractive body on the one hand and the emitting body on the other are constructed as separate subassemblies, in order to provide a motorcycle light in which a sufficient and sufficiently distributed light intensity can be created with an emitting surface that appears as attractive as possible. Beyond this, in order to provide a motorcycle light in which a sufficient and sufficiently distributed light intensity can be created with an emitting surface that appears as attractive as possible, cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that the reflector body on the one hand and the emitting body on the other hand are constructed as separate subassemblies. The separate construction of the emitting body, which ultimately represents the outer body of the overall arrangement, from the other subassemblies disposed in the main beam direction in front of the emitting body, surprisingly allows the emitting body to appear more uniform and more compact, even if many complex subassemblies are possibly to be found in front of it in main beam direction. Thus, by the separation of the subassemblies, it appears that visibility of the subassemblies disposed in front of the emitting body in the main beam direction can be successfully minimized in structurally simple manner, in order in this way to create an emitting surface that appears as attractive as possible and nevertheless to ensure a sufficient and sufficiently distributed light intensity, especially by the subassemblies disposed in front of the emitting body in main beam direction.

Cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can also be in order to provide a motorcycle light in which a sufficient and sufficiently distributed light intensity can be created with an emitting surface that appears as attractive as possible, characterized in that at least three light sources are provided, the mirror is respectively disposed laterally from the respective light source in relation to a main beam direction of each of the three light sources, the refractive body and the emitting body are constructed in one piece and a body having the refractive body, the emitting body and possibly the reflector body varies in its thickness measured parallel to the main emitting direction by less than 50% relative to the maximum thickness measured parallel to the main beam emission direction. In addition, alternatively or cumulatively thereto, in order to provide a motorcycle light in which a sufficient and sufficiently distributed light intensity can be created with an emitting surface that appears as attractive as possible, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least three light sources are provided, the mirror is respectively disposed laterally from the respective light source in relation to a main beam direction of each of the three light sources, the refractive body and the emitting body are constructed in one piece and a body having the refractive body, the emitting body and possibly the reflector body varies by less than 4 mm in its thickness measured parallel to the main beam direction. Such a small thickness variation means that slight influences are also exerted on the outer appearance of the emitting body, even though this is constructed in one piece with the refractive body and possibly with a reflector body. In turn, given suitable configuration, a correspondingly attractive exterior of the emitting surface or of the emitting body is achieved from this.

Preferably, a body having the refractive body, the emitting body and possibly the reflector body varies by less than 3 mm in its thickness measured parallel to the main beam direction or by less than 40% in relation to the maximum thickness measured parallel to the main beam direction. Within these size requirements, the outer appearance of the emitting body may be further harmonized.

In particular, the thickness variation explained in the foregoing relates to the interior of the emitting body or to its structures in the interior of the housing.

Furthermore, cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least two light sources share one reflector body and these two light sources are able to glow with different colors, in order to provide a motorcycle light in which a sufficient and sufficiently distributed light intensity can be created with an emitting surface that appears as attractive as possible. Cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least two light sources share one refractive body and these two light sources are able to glow with different colors, in order to provide a motorcycle light in which a sufficient and sufficiently distributed light intensity can be created with an emitting surface that appears as attractive as possible. Cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, can be characterized in that at least two light sources share one refractive mirror and these two light sources are able to glow with different colors, in order to provide a motorcycle light in which a sufficient and sufficiently distributed light intensity can be created with an emitting surface that appears as attractive as possible. By the fact that respectively two light sources, although glowing with different colors, respectively share a reflector body, a refractive body and/or a mirror, i.e. an optically active body disposed in the interior of the housing of the motorcycle light or in main beam direction in front of the emitting surface, the optical appearance, which is then imparted by this body to the emitting surface, can be configured more attractively than if respectively separate subassemblies were to be used here. Due to the different colors, a sufficient or sufficiently distributed light intensity can be assured with suitable configuration.

Beyond this, cumulatively or alternatively thereto, a motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting light emitted by the light source by means of total reflection and/or a refractive body refracting light emitted by the light source and/or a mirror reflecting light emitted by the light source are disposed between the light source and the emitting surface in a beam path of the light emitted by the light source, in order to provide a motorcycle light in which a sufficient and sufficiently distributed light intensity can be created with an emitting surface that appears as attractive as possible, can be characterized in that the reflector body has a reflector surface totally reflecting the light of the light source or the mirror has a mirror surface totally reflecting light of the light source and the reflector surface or the mirror surface deviate from a circular shape in a section plane perpendicular to the main beam direction of the light source and/or, in two section planes intersecting in the main beam direction of the light source, have different curvatures and/or different capture heights, defined parallel to the main beam direction of the light source, in relation to the respective light source. This permits an individual adaptation of the reflector surface and/or of the mirror surface to different requirements, especially when several light sources are supposed to share the reflector surface or the mirror surface.

In this regard, the following terms are to be explained:

A "motorcycle light" is preferably a device in which a light source is permanently installed or can be installed and which serves for illumination on a motorcycle. This includes in particular position lights, tail lights, turn signals, headlamps and brake lights as well as combinations thereof.

By "main beam direction", preferably that direction is understood in which respectively the highest light intensity is emitted by the motorcycle light. In the interior of the motorcycle light, the main beam direction is defined as the vector sum of all light paths, which may still experience—naturally—changes of direction during their transit from the light source outward to the emitting surface.

By "housing", what can be understood is a permanent enclosure of the motorcycle light, which surrounds the light source protectively and protects it from the environment. In particular, in the present connection, the housing surrounds the light source or the light sources of a motorcycle light. It will be understood that still further subassemblies, such as not only electrical components but also optically active subassemblies and the like may be provided in the housing. Preferably, the housing is sealed by the emitting body, although it may also have still further openings if necessary, for example cable openings through a holder or the like.

In particular, the housing may comprise a holder, with which it and thus also the motorcycle light can be fastened onto a motorcycle. Accordingly, by a "holder", any device is preferably understood that is set up to mechanically connect the housing of a motorcycle light or the motorcycle light directly or indirectly with the motorcycle. If necessary, supply lines may be routed into the housing through the holder.

By "motorcycle", what is understood is preferably a two-wheeled, three-wheeled or four-wheeled motor vehicle that does not have any sealed passenger compartment A motorcycle may be single-tracked or multiple-tracked. In particular, motorized vehicles with open sidecars as well as three-wheeled trikes and four-wheeled quads are also counted as motorcycles in the present context.

By "light exit opening", a region of the housing may be understood that is transparent to light and through which light is able to exit the housing. Preferably, the light exit opening is sealed by the emitting body.

By a "light source", any electrical operating means and/or any electrical consumer may be understood that is set up for generation of light.

By an "emitting surface", what is understood is especially a surface of a motorcycle light, from which the light emitted by the motorcycle light is emitted outward. By an "emitting body", what is then correspondingly understood is a body that has the emitting surface. In particular, an emitting body may be constructed from a material that is substantially transparent for light.

A "reflector" body is primarily a body set up to cast back or to reflect the light emitted by a light source, especially visible light, at a boundary surface at which the wave impedance or the refractive index of the propagation medium is changed. In particular, the reflector body may be set up to reflect the light completely at the boundary surface. This situation is also known as total reflection. In particular, a reflector body may be constructed from a material that is substantially transparent for light.

By a "refractive body", a body is mainly understood that is set up to shape the light emitted by a light source by means of refraction. In particular, the refractive body may be set up such that the light emitted by a light source and incident upon the refractive body then refracted in the direction of the reflector body is refracted in such a way that it is cast back by the reflector body by means of total reflection. Moreover, the refractive body may be set up such that the light emitted by a light source and incident upon the refractive body but not refracted in the direction of the reflector body is refracted diffusely. Likewise, light that is emitted from the reflector body to the refractive body can be refracted in desired manner by the refractive body and thus adapted in its emission direction once again. The refractive body is also able to refract light to a mirror or to further refractively reshape light arriving from a mirror. In particular, a refractive body may be constructed from a material that is substantially transparent for light.

In some embodiments, reflector body and emitting body, refractive body and emitting body or reflector body and refractive body may be constructed in one piece. At this point, it is to be remarked that the emitting body will usually be a refractive body, since it does not act refractively on the light only in the case of perpendicular light exit and even in the case of perpendicular light entry into the emitting body, or in the case of a refractive index corresponding to that of air. In particular, embodiments are also specifically conceivable in which reflector body, emitting body and refractive body are constructed in one piece.

By a "recess" of the refractive body, preferably a region is understood that interrupts the refractive body or in which the refractive body is extended with a non-differentiable surface profile or around which the refractive body is set back. The region has a bounding "rim of the central recess", wherein the rim is a boundary of the refractive body.

By a "mirror", preferably a body with a reflecting surface is understood, wherein the reflecting surface is set up to reflect light without allowing it to penetrate appreciably into the corresponding body.

By a "partial emitting surface", a part of the emitting surface may be understood, wherein a partial emitting surface is set up to emit substantially the light of a light sources associated with it or of several light sources associated with it. In particular, it is specifically conceivable that the motorcycle light also has a second partial emitting surface, wherein the second partial emitting surface is set up to emit substantially the light of a second light source assigned to it or of several second light sources associated with it. The number of partial emitting surfaces of a motorcycle light can be read, for example, on the basis of the color in which the light sources respectively glow. However, this does not necessarily have to be the case, since a motorcycle light may also have several light sources with identical color, which respectively emit light via different partial emitting surfaces.

In particular, a partial emitting surface is an emitting surface, wherein the emitting surface of the motorcycle light in the present case is intended to have precisely at least two partial emitting surfaces, although if necessary it may also have still further emitting surfaces. Accordingly, an emitting surface may be composed of several partial emitting surfaces. If necessary, partial emitting surfaces may also overlap, which may be the case in particular when several light sources share optically active subassemblies, such as mirrors, reflector bodies, refractive bodies or the like.

It is conceivable that the line-shaped raised molding deflecting a light laterally relative to the main beam direction may also have curved lines. Hereby, not only the emission characteristic but also the optical appearance of the emitting surface can be configured and adapted to a correspondingly attractive exterior.

Naturally, the thickness of a refractive body or of an emitting body or of a reflector body may influence the reflecting or refracting properties, and so intentionally chosen thicknesses of the said bodies may achieve a corresponding desired effect.

Preferably, the emitting body has at its emitting surface at least two line-shaped raised moldings deflecting the light laterally relative to the main beam direction and respectively extending at least over two of the partial emitting surfaces, wherein the shape of their line is aligned horizontally next to one another, i.e. preferably in parallel. In this case, the shape of the line of one line-shaped raised molding may indeed be curved, so that the other line-shaped raised molding is then able to follow this curvature in correspondingly parallel manner.

Alternatively or cumulatively thereto, the line-shaped raised moldings may contact one another or merge with one another perpendicular to the shape of their line. In this way, it is possible that a sufficient and sufficiently distributed light intensity will be created with an emitting surface that appears as attractive as possible, and so the motorcycle light may be further optimized in this respect.

In order to keep effects at the rim as small as possible and/or to not allow them to become too considerable, especially when the rim is not too large, the rim may be extended parallel to the emitting surface by no more than 1 mm in the region of the rim in the direction of the main beam direction. Alternatively or cumulatively thereto, the rim is preferably extended for this reason parallel to the emitting surface by no more than the smallest thickness of the emitting body.

Advantageously, the motorcycle light has a main axis aligned parallel to the main beam direction, wherein the light source or sources are disposed symmetrically relative to the main axis, in order likewise to create a sufficient and sufficiently distributed light intensity with an emitting surface that appears as attractive as possible and thus to further optimize the motorcycle light in this respect.

For a construction that is as simple as possible, several reflector bodies may be provided and combined in a common subassembly.

Advantageously, the emitting surface is convexly cambered beyond the rim. In particular, the camber is formed in main beam direction. In this way, the lateral visibility of the motorcycle light can be enhanced.

In order to position a reflector surface of the reflector body well and in particular deep manner laterally relative to the light source, the reflector body preferably has a central recess.

It is of advantage when the refractive body spreads out the light penetrating into it. Cumulatively or alternatively thereto, the refractive body may also focus the light penetrating into it. The refractive body is therefore preferably optically active and does not simply function as merely a translucent body. Thereby the light may then be selectively bundled or spread out, so that an optimum distribution may be imposed.

Cumulatively or alternatively thereto, the refractive body preferably has optically active structures, such as, for example, at least one convex region or different curvatures and the like, which exploit the optical activity of the refractive body. This permits an individual adaptation of the refractive body to the respective requirements.

Advantageously, the integral heightened molding or integral heightened moldings extend in their extent in main beam direction by less than 10% of the distance between the light source and the emitting surface. It is also advantageous when the integral heightened molding or integral heightened moldings extend in their extent in main beam direction by less than the thickness of the emitting body. Hereby the emitting body and especially the raised moldings are not too massive, and so the integral heightened molding or integral heightened moldings impact the appearance of the motorcycle light at most by their large number.

For a sufficient and sufficiently distributed light intensity with an emitting surface that appears as attractive as possible, preferably two light sources may share one reflector body, one refractive body and respectively one mirror, as already explained in the foregoing. The same advantage is obtained when the light sources specifically share one reflector surface of the reflector body, one convex or concave region of the refractive body and/or one mirror surface of the mirror.

It is advantageous when the housing has a holder for fastening of the housing on a motorcycle, in order then to fasten the motorcycle light correspondingly simply to a motorcycle. In particular, the motorcycle light then appears to be a standalone subassembly, which is joined to the motorcycle only via the holder. This independence is accentuated when the holder is constructed as a holding arm.

It will be understood that the features of the approaches described in the foregoing or in the claims may also be combined as the case may be, in order that the advantages can be exploited correspondingly cumulatively.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

The motorcycle lights 10 from FIGS. 1 to 9 are set up for fastening and for operation on a motorcycle 11 and respectively have a main beam direction 12 along a main axis 14.

Figure 1:
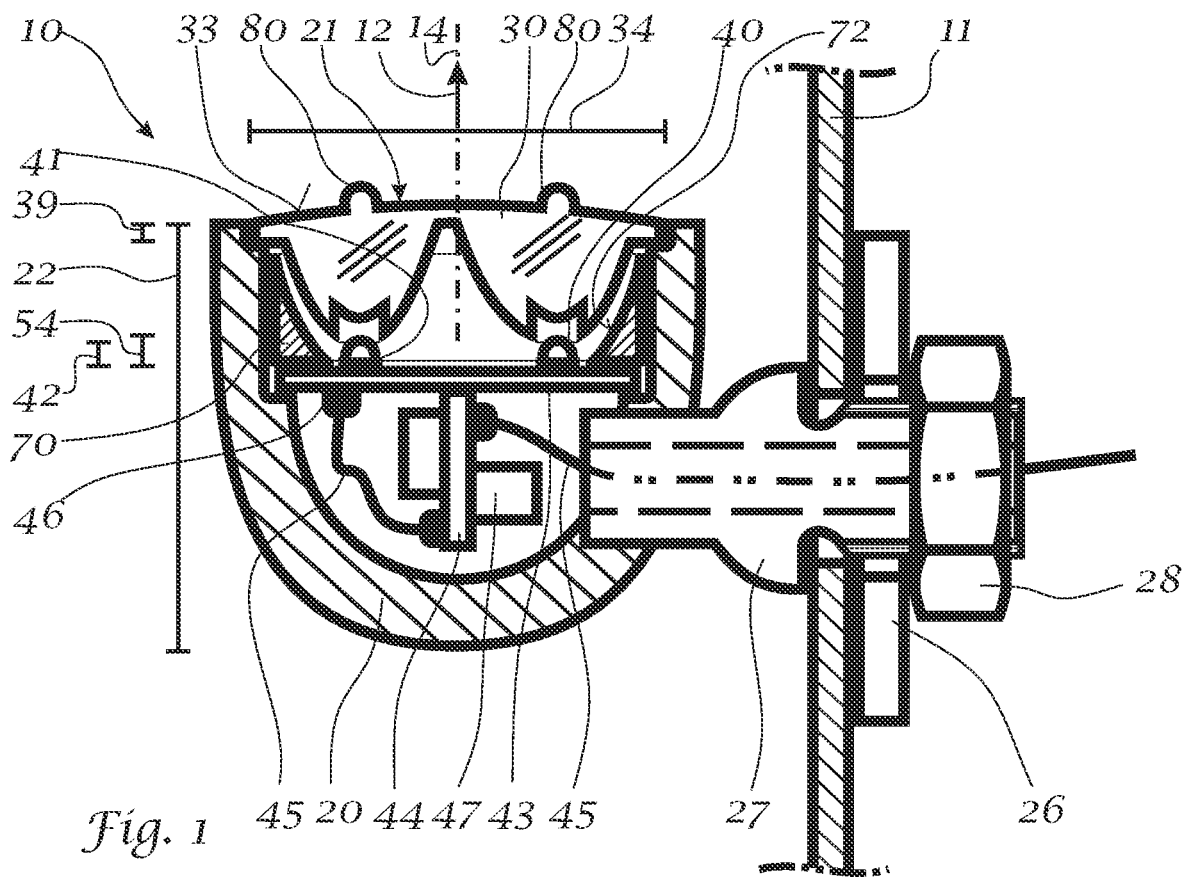
FIG. 1 shows a schematic section through a motorcycle light with two raised moldings along line I-I in FIG. 2.
Figure 2:
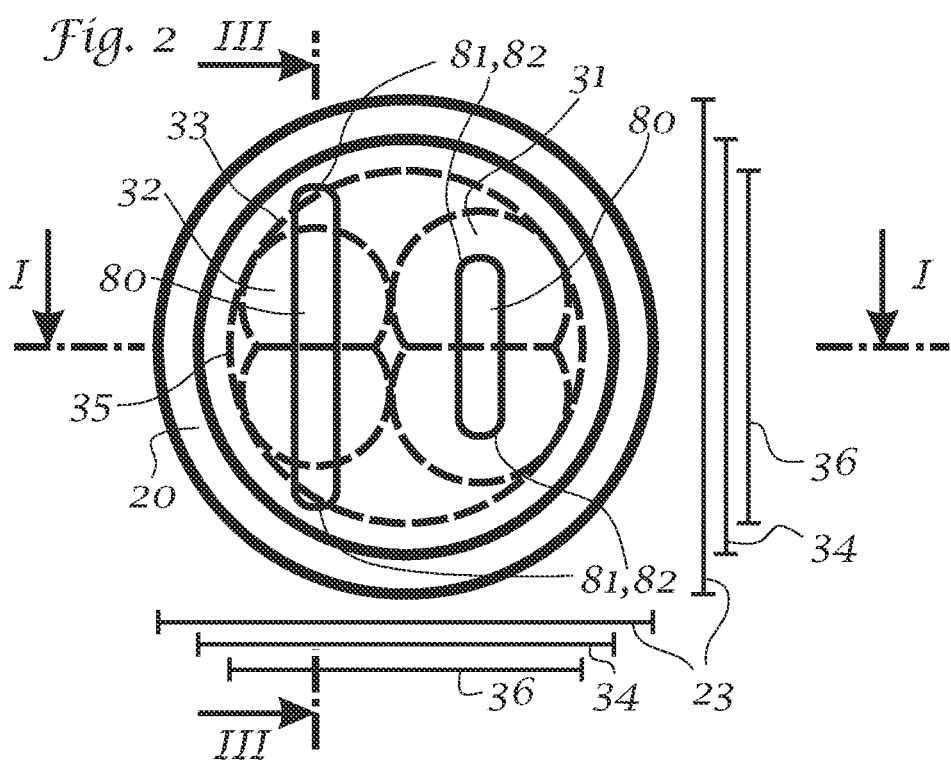
FIG. 2 shows the motorcycle light according to FIG. 1 schematically in a view opposite its main beam direction.
Figure 3:
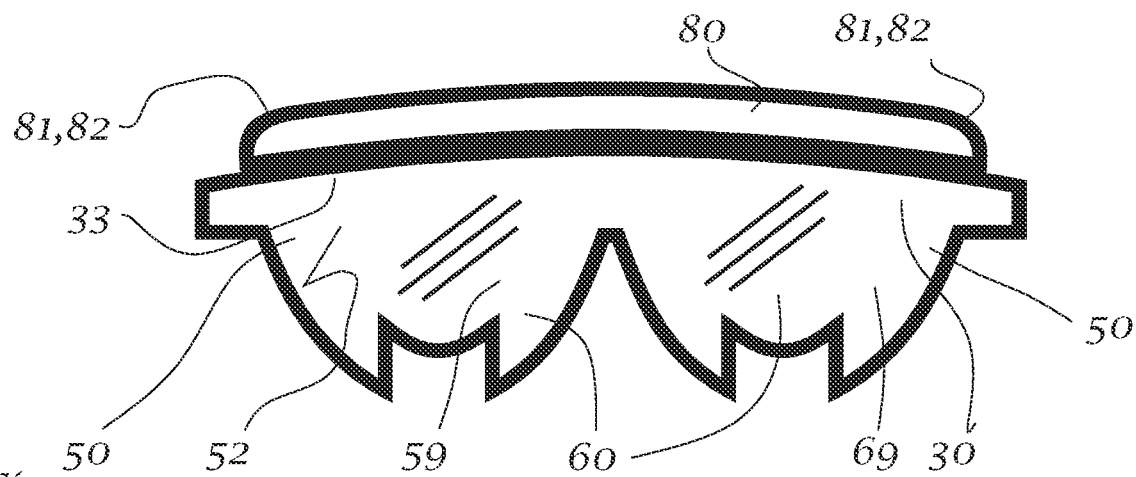
FIG. 3 shows the motorcycle light according to FIGS. 1 and 2 in a section along line III-III in FIG. 2.

In a first exemplary embodiment according to FIGS. 1 to 3, a housing 20 of the motorcycle light 10 respectively has a light exit opening 21, which is substantially transparent for visible light (not illustrated) and through which light (not illustrated) is able to exit the motorcycle light 10 through an emitting body 30. Furthermore, the housing 20 has an extent 22 and a diameter 23.

The housing 20 of the motorcycle light 10 illustrated in FIGS. 1 to 3 comprises a holder 27, which if applicable may also be constructed in one piece with the housing 20.

The emitting body 30 of the motorcycle light 10 illustrated in FIGS. 1 to 3 has a diameter 34 and a thickness 39.

Likewise, an emitting surface 33 of the emitting body 30 has a diameter 36 and is set up such that light (not illustrated) is able to exit the motorcycle light 10.

Moreover, the emitting body 30 has several first partial emitting surfaces 31 and several second partial emitting surfaces 32. The first partial emitting surfaces 31 are set up such that light (not illustrated) of a first light color can be emitted by the motorcycle light 10. The second partial emitting surfaces 32 are set up such that light of a second light color can be emitted by the motorcycle light 10. The partial emitting surfaces 31, 32 of this exemplary embodiment are respectively assigned an individual light source 40. In differing embodiments, several light sources 40, which then share optical subassemblies, may also be provided here per partial emitting surface 31, 32.

The emitting body 30 of the motorcycle light 10 from FIGS. 1 to 3 respectively has two raised moldings 80 with a beginning 81 and an end 82, which is respectively set up to emit light in lateral direction (not illustrated, but in FIGS. 1 and 2 defined respectively as right and left and in FIG. 3 defined as into and out of the plane of the drawing) relative to the main beam direction 12 of the motorcycle light 10.

The emitting body 30 of the motorcycle light 10 according to FIGS. 1 to 3 is cambered slightly outward, so that light may also be emitted laterally via the camber. Depending on specific requirements, the lateral visibility of the motorcycle light 10 or of the light output by it may be additionally influenced positively. It will be understood that such a camber may also be omitted in differing embodiments.

The raised moldings 80 of the motorcycle light 10 illustrated in FIGS. 1 to 3 extend over two of the partial emitting surfaces 31. In addition, the beginning 81 and the end 82 of one of these raised moldings 80 lies on a rim 35 of the emitting surface 33, whereby a maximum effectiveness of this raised molding is achieved. In this specific exemplary embodiment, the latter appears to be unnecessary for the second raised molding 80, which overlaps the two partial emitting surfaces 31.

The emitting body 30 of the motorcycle light 10 from FIGS. 1 to 3 is framed laterally by the housing 20, so that it is not set up to emit light in lateral direction relative to the main beam direction 12 of the motorcycle light 10, if the raised moldings 80 and the camber are disregarded.

A light source 40 of the motorcycle light 10 from FIGS. 1 to 3 has respectively a base 41 and an extent 42 starting from the base 41. This extent is defined by the main beam direction 49 of the respective light source 40 (illustrated by way of example in FIG. 5), wherein the main beam direction 49 of each of the light sources 40 may be defined by its center of the emission cone or by the sum of all emission vectors.

The light sources 40 are carried by a carrier board 43 and are activated, for example, by electronic components 47, which in this exemplary embodiment are disposed on a board 44. It will be understood that, in alternative embodiments, the electronic components 47 may be disposed additionally or as alternatives on the carrier board 43.

The light sources 40 may be respectively supplied with electrical current (not illustrated) via a cable 45, which is joined to the board 44 and to the carrier board 43 respectively via a solder junction 46. A further cable 45 is set up to supply the board 44 with electrical current (not illustrated), wherein this cable 45 is joined by means of a solder junction 46 to the board 44 at one end and is routed through the holder 27 in the direction of the motorcycle 11, so that the motorcycle light 10 may be supplied by means of electrical current (not illustrated) by the motorcycle 11.

The motorcycle lights 10 each respectively have light source 40, reflector body 50 and refractive body 60.

The reflector body 50 of the motorcycle light 10 from FIGS. 1 to 3 has respectively a reflector surface 52 (see FIGS. 3 and 5 by way of example) on an inner surface and is constructed in one piece with the emitting body 30, which has two first partial emitting surfaces 31 and two second partial emitting surfaces 32, and with the associated refractive body 60. In the exemplary embodiments illustrated in FIGS. 1 to 3, respectively two refractive bodies 60 and reflector bodies 50 are constructed in one piece with the emitting body 30.

In addition, the reflector body 60 has a capture height 54, with which it captures in the neighborhood of the respective light source.

In the present exemplary embodiment, the reflector bodies 50 form a common subassembly 59. The refractive bodies 60 form a common subassembly 69.

The motorcycle light 10 from FIGS. 1 to 3 comprise substantially a housing 29, the emitting body 30, four light sources 40 and a holder 27 constructed as a holding arm that is fastened via nut 28 and a washer 26 to the motorcycle 11.

Beyond this, the motorcycle lights 10 from FIGS. 1 to 3 respectively have a mirror 70 to the side of the light source 40, of the refractive body 60 and/or of the reflector 50, which mirror is set up to reflect, in the direction of the emitting body 30 or roughly in the direction of the main beam direction 12, those light rays which do not enter on the direct path after exiting the light source 40 into the reflector body 50 and/or into the refractive body 60 or which perhaps even exit these laterally, so that they enter the emitting body 30 indirectly or directly and are able to be emitted via the emitting surface 33 of the motorcycle light 10.

Figure 4:
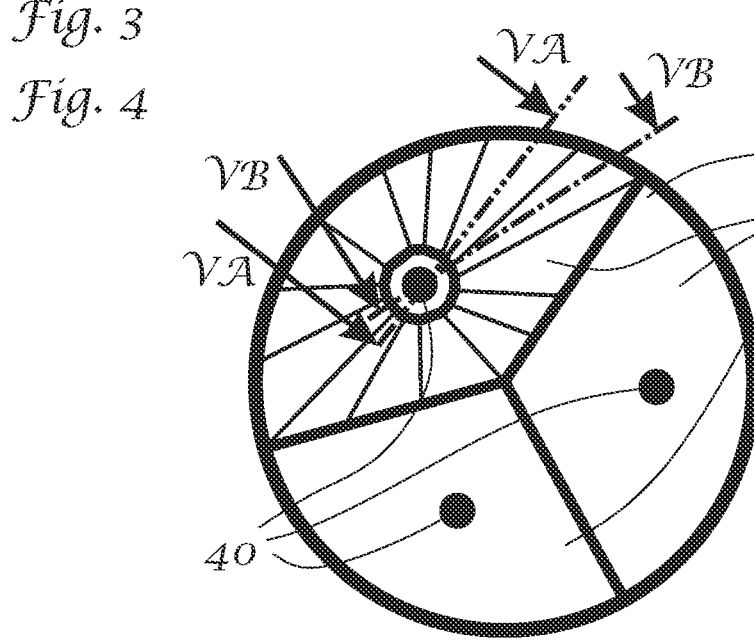
FIG. 4 shows a schematic head-on view of an emitting surface of a further motorcycle light opposite the main beam direction.
Figure 5:
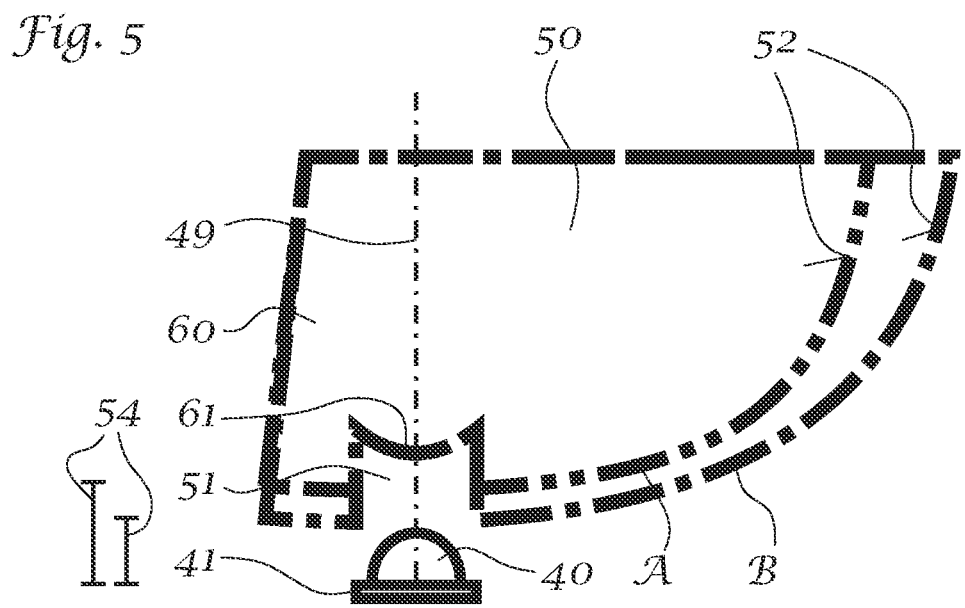
FIG. 5 shows two overlapped sections A and B respectively along lines VA-VA and VB-VB in FIG. 4.

In a further exemplary embodiment, which is illustrated by way of example in FIGS. 4 and 5 and in other respects corresponds substantially to the exemplary embodiment according to FIGS. 1 to 3, the emitting body 30 comprises three partial emitting surfaces 31 with respectively one light source 40. In this exemplary embodiment, raised moldings 80 as well as a camber of the emitting surface has been omitted, wherein instead of this the housing 20 may be constructed in slightly recessed manner if necessary, in order to ensure an adequate lateral visibility.

Each reflector body 50 or refractive body 60 associated with a light source 40 in the exemplary embodiments according to FIGS. 1 to 5 has a central recess 51. In horizontal direction, a light source 40 with a base 41 is disposed at the height of the central recess 51. The light source 40 and the central recess 51 are disposed as coaxially as possible relative to a main beam direction 49 of the light source 40.

The transition from the central recess 51 to the refractive body 60 in the exemplary embodiments illustrated in FIGS. 1 to 5 is constructed as a convex region 61 of the refractive body 60.

Moreover, the reflector body 50 has reflector surfaces 52. The distance from the reflector body 50 to the light source 40 represents the capture height 54 of the reflector body 50.

Whereas the central recesses 51 and/or the reflector bodies 50 and the refractive bodies 60 of the exemplary embodiment illustrated in FIGS. 1 to 3 are disposed in substantially rotationally symmetric manner around the respective light source 40, which can be implemented with relatively simple construction, in the exemplary embodiment illustrated in FIGS. 4 and 5, the reflector body 50 or the refractive body 60 is constructed asymmetrically relative to the respective light source 40 or its main beam direction 49, as is illustrated by way of example for one of the light sources 40 in FIGS. 4 and 5.

In this connection, the reflector body 50 or the refractive body 60 illustrated in FIGS. 4 and 5 is specifically subdivided into sectors, which are disposed around the main beam direction 49 of the respective light source 40. This is illustrated by way of example in FIG. 4 for one of the light sources 40.

In this way, the reflector surface 52 deviates from a circular shape in its section plane perpendicular to the main beam direction 49 of the light source 40. Also, different curvatures as well as differently defined capture heights 54 relative to the respective light source 40 are obtained in various section planes, as illustrated by way of example by section plans A and B in FIGS. 4 and 5.

Certainly the segmentation as has been explained in the foregoing imposes a certain structure, which is possibly perceptible even from outside the emitting surfaces 33. However, the segmentation permits a somewhat simplified control and calculation of the associated light paths, and so a sufficient and sufficiently distributed light intensity can be ensured in relatively simple manner, while the attractive exterior of the emitting surface 33 may still be influenced if necessary by further measures, such as, for example, integral heightened moldings or line-shaped raised moldings 80.

Whereas four light sources 40 are provided in the exemplary embodiment illustrated in FIGS. 1 to 3, of which two respectively emit in identical color, as is indicated by the designation of the partial emitting surfaces 31, 32 with respectively a common reference numeral, only one color for all three light sources 40 is provided in the exemplary embodiments illustrated in FIGS. 4 and 5. It will be understood that, in differing exemplary embodiments, different colors may also be provided here for the light sources 40, so that here also partial emitting surfaces 31 or 32 may be defined that emit light with different colors.

Figure 6:
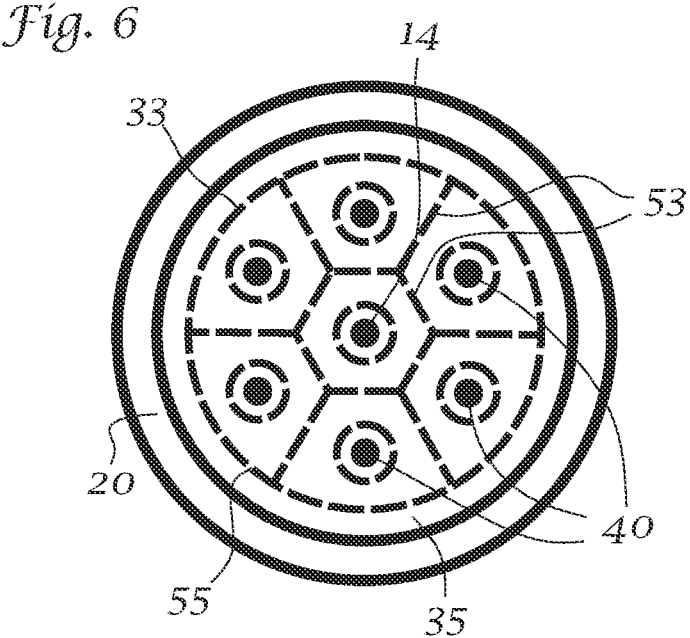
FIG. 6 shows a schematic head-on view of a further motorcycle light with seven light sources.

In the exemplary embodiment illustrated in FIG. 6, seven light sources 40 are disposed at equal distances from one another in the housing 20 disposed around a main axis 14 and are bounded off from one another by means of section lines 53 of reflector surfaces 52 and are surrounded outwardly by a rim line 55 of the reflector surface 52. The rim 35 of the emitting surface 33 then directly adjoins the rim line 55.

The seven light sources 40 are disposed symmetrically around the main axis 14, wherein the deviations of the section lines 53 or rim lines 55 of the reflector surfaces 52 from a circular shape provided around the main beam direction 14 of the respective light source 40 may be compensated if necessary, possibly by the arrangements of the exemplary embodiment according to FIGS. 4 and 5.

As the different exemplary embodiments show, the number of raised moldings 80 of a motorcycle light 10 as well as the direction in which light can be emitted laterally relative to the main beam direction 12 of the motorcycle light 10 may be varied.

Figure 7:
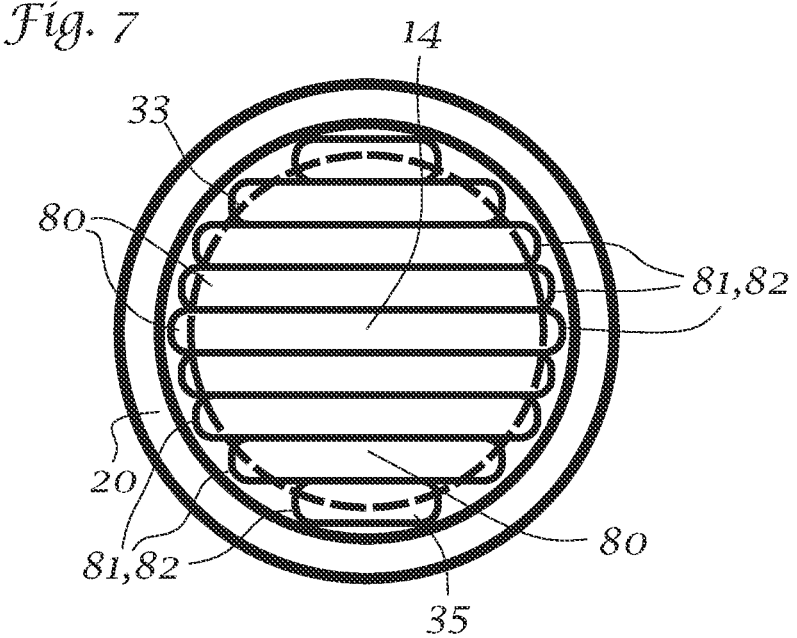
FIG. 7 shows a schematic head-on view of a further motorcycle light with parallel line-shaped raised moldings.

In the exemplary embodiment illustrated in FIG. 7, which can be combined if necessary with the exemplary embodiments according to FIGS. 1 to 6, several adjacent raised moldings 80 are disposed parallel to one another on an emitting surface 33, with their beginning 81 and their end 82 respectively lying on a rim 35 of the emitting surface.

This arrangement with line-shaped raised moldings 80 merging into one another, contacting one another or merging with one another can be combined in particular with the arrangement according to the exemplary embodiment according to FIG. 6 and/or may also be aligned vertically instead of horizontally.

It will be understood that even more complex arrangements of the raised moldings 80 may be provided here, for example as curved lines.

Figure 8:
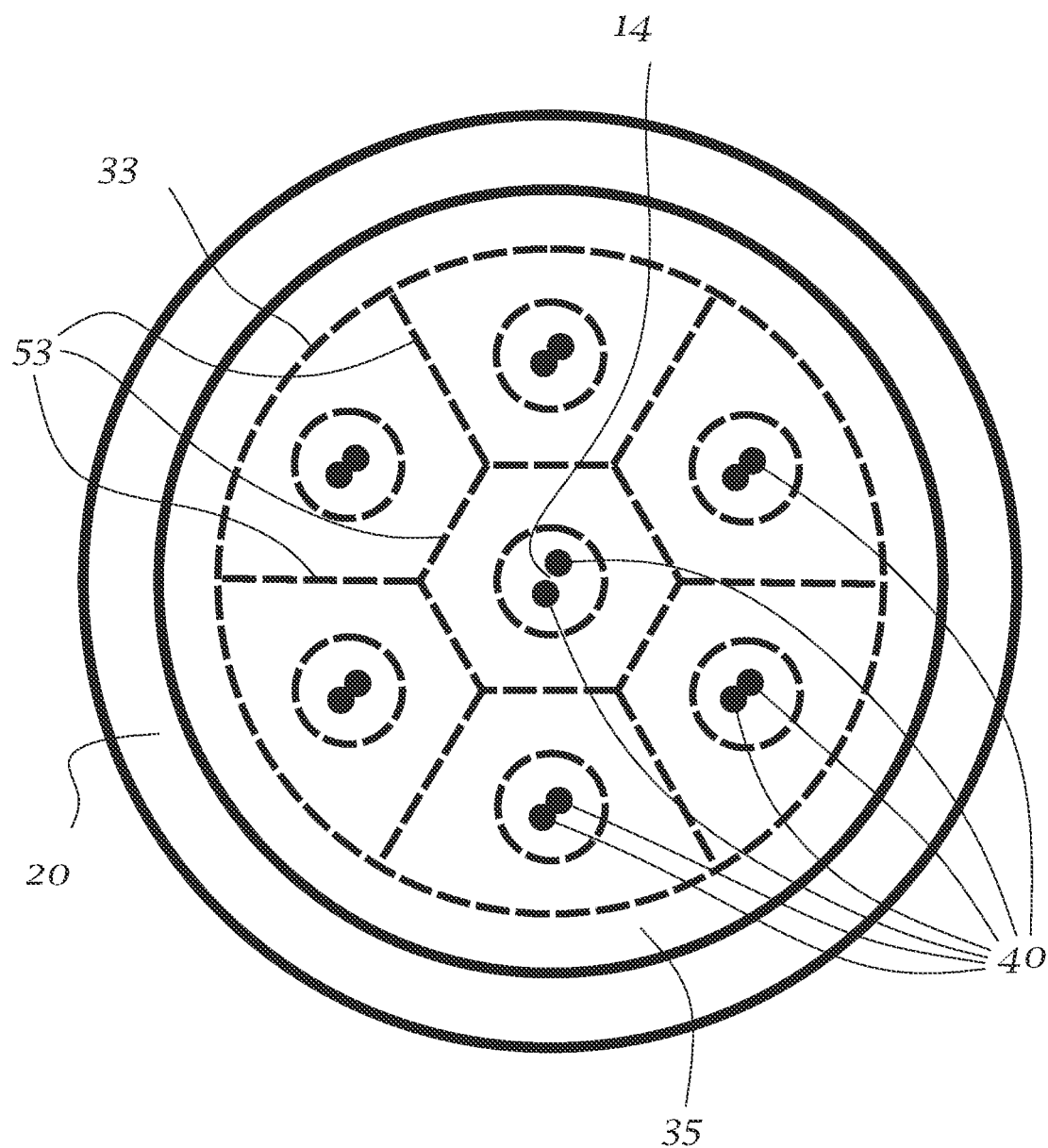
FIG. 8 shows an arrangement similar to FIG. 6 in which, however, respectively two light sources in different colors respectively share a refractive body and/or reflector body.
Figure 9:
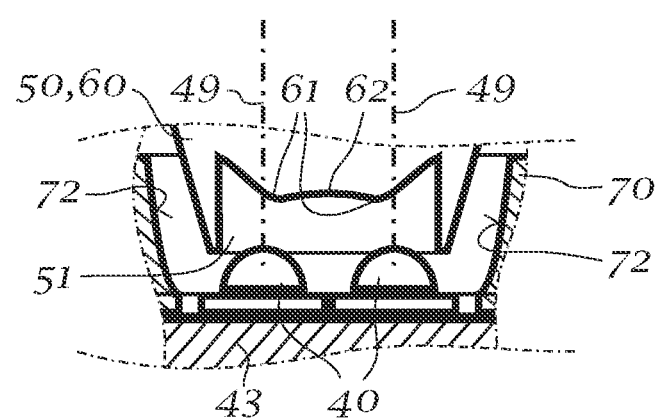
FIG. 9 shows a detail view of a pair of light sources from FIG. 8 that share a mirror and/or a refractive body and reflector body.

In a further exemplary embodiment according to FIGS. 8 and 9, the arrangement of which resembles that of the exemplary embodiment according to FIG. 6, the arrangement comprises respectively two light sources 40, which have in different colors and respectively share a refractive body 60 and reflector body 50.

Due to the two light sources 40 per emitting surface 33, two main beam directions 49 of the light sources 40 are also obtained. The light sources 40 are disposed on a carrier board 43.

Both light sources 40 are disposed inside a central recess 51 of the respective reflector body 50 and emit along the main beam direction 49 through a convex region 61 and through a concave region 62 of the refractive body 60.

In addition, the arrangement according to this exemplary embodiment has a mirror 70 with a mirror surface 72.

As is to be inferred from the detail view according to FIG. 9, the refractive body 60 has a convex region 61, a concave region 62, which is disposed radially relative to the main beam direction 12 inside the convex region 61, and a lateral region, which in turn surround the recess up to its rim.

Depending on specific implementation, the two light sources 40 may have different or identical colors. Due to identical colors, a higher light intensity is then obtained, whereas, due to different colors, not only may a play of colors be implemented if necessary, but so also may especially different light situations, such a brakes and tail lights in red, turn signals in yellow or position lights in white. By the fact that the two light sources 40 respectively share the refractive body 60, the reflector body 50 or the mirror 70, an emitting surface 33 that appears as attractive as possible can be provided with a sufficient or sufficiently distributed light intensity.

Figure 10:
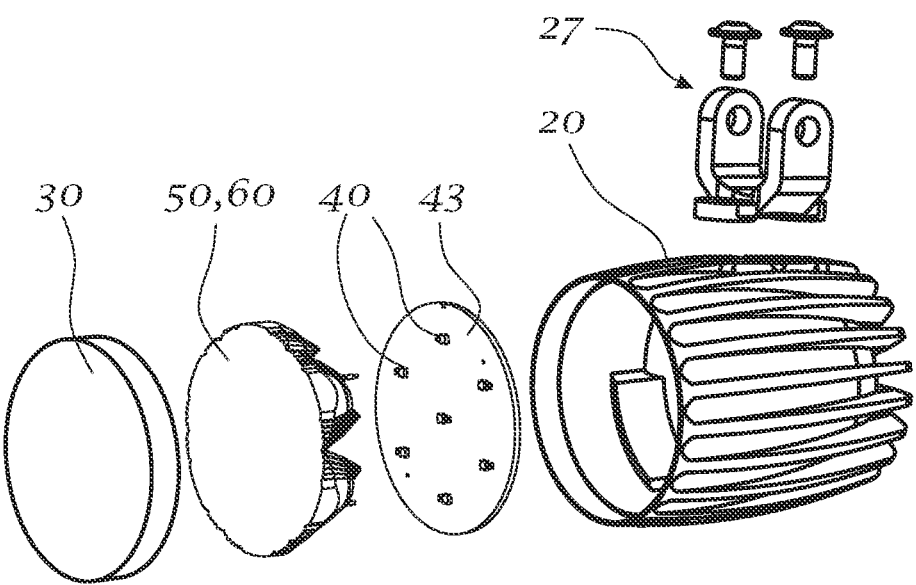
FIG. 10 shows an exploded view of a further motorcycle light.
Figure 11:
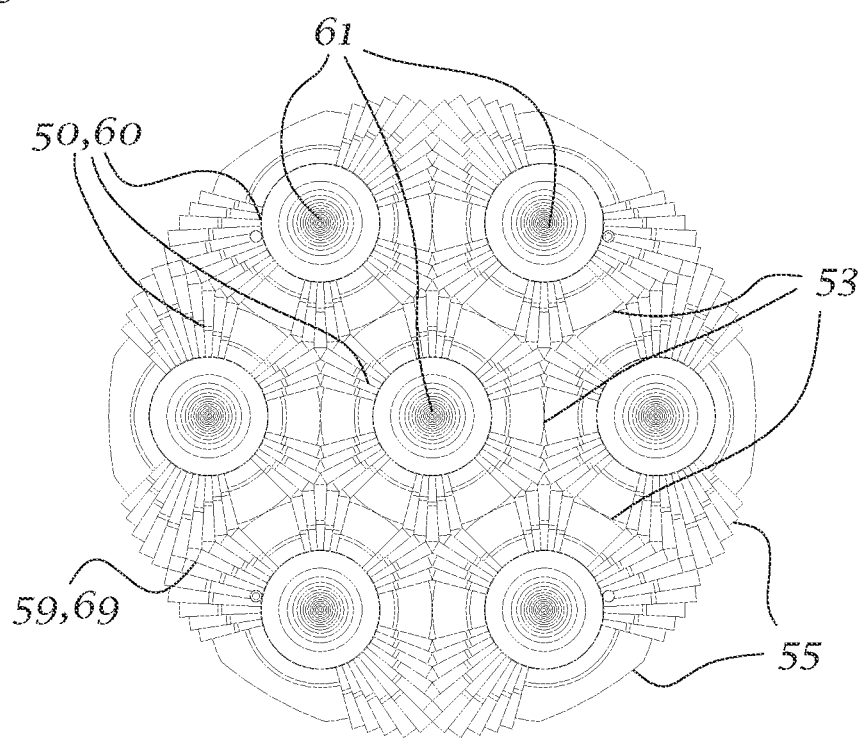
FIG. 11 shows the reflector body and refractive body of the arrangement according to FIG. 10 in a view in main beam direction.

In a further exemplary embodiment illustrated in FIGS. 10 and 11, the motorcycle light 10 comprises a housing 20 with a holder 27 as well as a carrier board 43 with seven light sources 40 disposed thereon at equal distances from one another, with a reflector body 50 and a refractive body 60 and with an emitting body 30. To this extent, this exemplary embodiment corresponds substantially to the exemplary embodiment illustrated in FIGS. 8 and 9.

The refractive body 60 has a convex region 61 and the refractive bodies 60 form a common subassembly 69.

The reflector bodies 50 are in contact with one another along section lines 53. In the outer region, the reflector bodies 50 form a rim line 55 of the reflector surfaces 52. Moreover, the reflector bodies 50 form a common subassembly 59.

Each of the individual reflector bodies 50 has a reflector surface 52 that deviates from circular shape and/or has different curvatures and capture heights 54, and this may also be implemented if necessary in the exemplary embodiment illustrated in FIGS. 8 and 9.

Beyond this, the common subassemblies 59, 69 of the reflector bodies 50 and of the refractive bodies 60 are constructed in one piece with one another, thus permitting a simple alignment of these subassemblies 59, 69.

In contrast, the emitting body 30 is constructed separately from the refractive bodies 60 or their common subassembly 69 and from the reflector bodies 50 or their common subassembly 59, thus permitting an attractive exterior of the emitting body 30.

Figure 12:
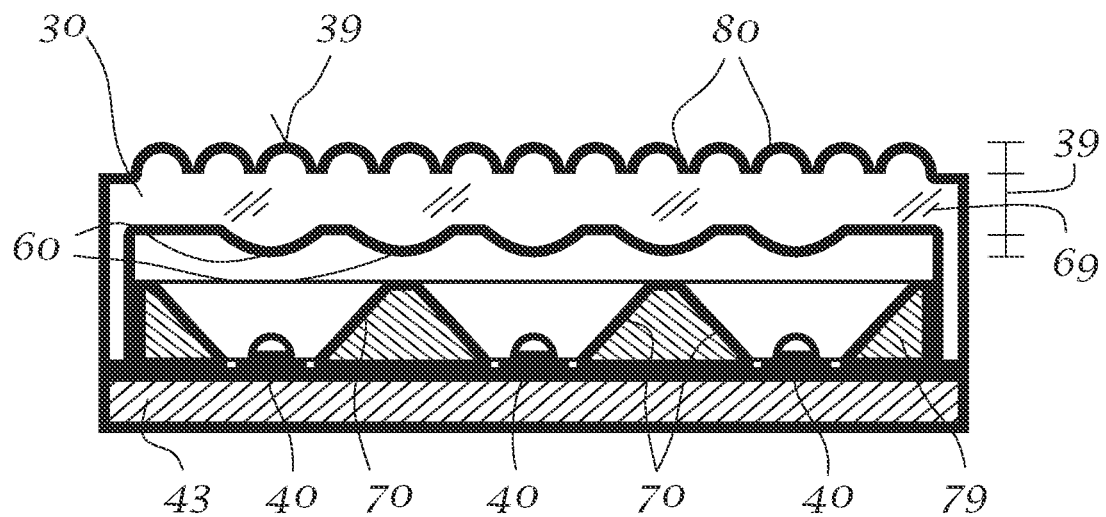
FIG. 12 shows a schematic section through a carrier board with light sources, a subassembly that carries a corresponding number of mirrors as well as through a common subassembly for the refractive body and the emitting body.

In a further exemplary embodiment, as illustrated in FIG. 12, the motorcycle light 10 carries several mirrors 70 and comprises a common subassembly 79 of the mirrors 70. The emitting body 30 also comprises a common subassembly 69 of the refractive body 60, wherein a reflector body is omitted in this exemplary embodiment, which permits a correspondingly compact design.

Between the mirrors 70, respective light sources 40 are disposed on a carrier board 43. In addition, several raised moldings 80 disposed next to one another are provided on the emitting body 30. The emitting body 30 also has a thickness 39, which varies by less than 50%, wherein the variation is caused by the integral heightened moldings of the refractive bodies 60 and by the raised moldings 80.

Figure 13:
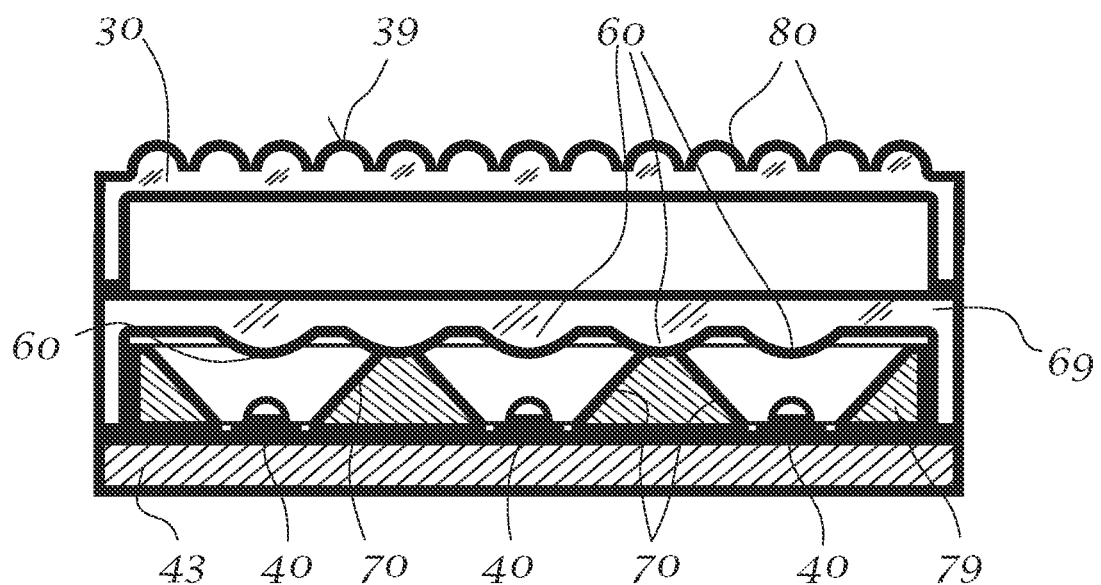
FIG. 13 shows a schematic section through a carrier board with light sources, a subassembly that carries a corresponding number of mirrors as well as through a a refractive body and an emitting body.

In a further exemplary embodiment according to FIG. 13, basically the arrangement according to the exemplary embodiment according to FIG. 12 is provided, wherein the emitting body 30 and a common subassembly 69 carrying the refractive bodies 60 are separate, which is structurally somewhat less compact but due to the open space between the emitting body 30 and the refractive body 60 imparts a corresponding appearance to the head-on view of the motorcycle light 10.

Instead of or in addition to a segmentation of the reflector body 50 or of its reflector surface 52, the mirror surface of a mirror may also be correspondingly segmented in order to compensate for deviations of the section lines or rim lines of the mirror surfaces from a circular shape provided around the main beam direction of the respective light sources, so that a light pattern that is as uniform as possible can be ensured.

Although only a few embodiments of the present invention have been shown and described, it is to be understood that many changes and modifications may be made thereunto without departing from the spirit and scope of the invention.

LIST OF REFERENCE SYMBOLS

10 Motorcycle light
11 Motorcycle
12 Main beam direction
14 Main axis
20 Housing
21 Light exit opening
22 Extent of the housing 20
23 Diameter of the housing 20
26 Washer 27 Holder
28 Nut
29 Housing
30 Emitting body
31 Partial emitting surface
32 Partial emitting surface
33 Emitting surface
34 Diameter of the emitting body 30
35 Rim of the emitting surface 33
36 Diameter of the emitting surface 33
39 Thickness of the emitting body 30
40 Light source
41 Base of the light source 40
42 Extent of the light source 40
43 Carrier board
44 Board
45 Cable
46 Solder junction
47 Electronic component
49 Main beam direction of the light source 40
50 Reflector body
51 Central recess of the reflector body 50
52 Reflector surface of the reflector body 50
53 Section line of reflector surfaces 52
54 Capture height of the reflector body 50
55 Rim line of the reflector surfaces 52
59 Common subassembly of the reflector bodies 50
60 Refractive body
61 Convex region of the refractive body 60
62 Concave region of the refractive body 60
63 Lateral region of the refractive body 60
69 Common subassemblies of the refractive bodies 60
70 Mirror
72 Mirror surface of the mirror 70
79 Common subassembly of the mirrors 70
80 Raised molding
81 Beginning of the raised molding 80
82 End of the raised molding 80

The invention claimed is:

1. A motorcycle light with a housing having a light-exit opening, with an emitting body that seals the light-exit opening translucently and has an emitting surface, and with a light source disposed in the housing and emitting light outward through the emitting body in a main beam direction, wherein a reflector body reflecting the light emitted by the light source by means of total reflection or a refractive body refracting light emitted by the light source or a mirror reflecting light emitted by the light source is disposed between the light source and the emitting surface in a beam path of the light emitted by the light source, wherein
   (i) at least three light sources are provided, the mirror is respectively disposed laterally from the respective light source in relation to a main beam direction of each of the three light sources, the refractive body and the emitting body are constructed in one piece and a body having the refractive body, the emitting body and possibly the reflector body varies in its thickness measured parallel to the main emitting direction by less than 50% relative to the maximum thickness measured parallel to the main emission direction or by less than 4 mm, or
   (ii) the reflector body has a reflector surface totally reflecting a light of the light source or the mirror has a mirror surface reflecting a light of the light source and the reflector surface or mirror surface deviate from a circular shape in a section plane perpendicular to the main beam direction of the light source or, in two section planes intersecting in the main beam direction of the light source, have different curvatures or different capture heights, defined parallel to the main beam direction of the light source, in relation to the respective light source.

2. The motorcycle light according to claim 1, wherein the motorcycle light has a main axis aligned parallel to the main beam direction and the light source or sources are disposed symmetrically relative to the main axis.

3. The motorcycle light according to claim 1, wherein several reflector bodies are provided and these reflector bodies are combined in a common subassembly.

4. The motorcycle light according to claim 1, wherein the reflector body has a central recess.

5. The motorcycle light according to claim 1, wherein the refractive body spreads out or focuses the light penetrating into the refractive body or wherein the refractive body has optically active structures.

6. The motorcycle light according to claim 5, wherein the optically active structures comprise at least one convex region.

7. The motorcycle light according to claim 1, wherein the housing has a holder for fastening of the housing on a motorcycle.

* * * * *